UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF MANUFACTURING AMMONIA.

1,053,952. Specification of Letters Patent. Patented Feb. 18, 1913.

No Drawing. Application filed November 25, 1911. Serial No. 662,291.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in the Process of Manufacturing Ammonia, of which the following is a specification.

It is known that manganese can be used as a catalyst when combining nitrogen and hydrogen to prepare ammonia, but it is always found that when manganese is used in this way its activity diminishes to an essential degree upon continued use. We have now found a process by means of which it is possible to use manganese continuously as a catalyst, whereby it retains its activity and gives good results. For this purpose, besides securing the absence of the known contact substance poisons, it is merely necessary that the mixture of nitrogen and hydrogen should be completely freed from oxygen, whether free or combined, as for instance in the form of steam, before the mixture enters the catalytic furnace. The freedom from moisture that can be obtained by passing the gases at a temperature of 300° C. over asbestos impregnated with palladium and subsequently over chlorid of calcium is not sufficient for the purposes of this invention. Even after treatment in this way small traces of oxygen or steam remain present in the mixture and these traces are sufficient to reduce the activity of the manganese as described. In order to free the gases to a sufficient degree from oxygen or steam, we treat them directly or after they have been treated as above described with palladium-asbestos and dried with chlorid of calcium so as to free them from the principal quantity of oxygen and steam. The treatment recommended is passing the gases over metallic sodium or over magnesium nitrid, which should be heated, or over similar substances which decompose water and fix oxygen.

When using manganese as a catalyst for the production of ammonia, it becomes partly or entirely converted into nitrid; if desired, manganese nitrid can itself be filled into the catalytic furnace.

A suitable temperature at which the mixture of nitrogen and hydrogen may be passed over the catalytic agent according to our invention is 600° C., but the temperature may be varied considerably without departing from the nature of the invention.

Now what we claim is:—

1. The process of producing ammonia by passing a mixture containing nitrogen and hydrogen over a heated catalytic agent containing manganese, while avoiding the presence of any traces of oxygen, whether free or combined.

2. The process of producing ammonia by freeing a mixture of hydrogen and nitrogen from the least traces of oxygen, whether free or combined, and then passing the said mixture over a heated catalytic agent containing manganese.

3. The process of producing ammonia by passing a mixture containing nitrogen and hydrogen over a substance which decomposes water, fixing the oxygen, and then passing the said mixture over a heated catalytic agent containing manganese.

4. The process of producing ammonia by passing a mixture containing nitrogen and hydrogen over metallic sodium and then over a heated catalytic agent containing manganese.

In testimony whereof we have hereunto set our hands in the presence of two subscribing witnesses.

CARL BOSCH.
ALWIN MITTASCH.

Witnesses:
A. O. TITTMANN,
JAMES FLEMING.